US012754195B2

(12) United States Patent
Watahiki et al.

(10) Patent No.: US 12,754,195 B2
(45) Date of Patent: Oct. 6, 2026

(54) AUTOMATIC ANALYSIS SYSTEM AND SAMPLE DISTRIBUTION METHOD

(71) Applicant: Hitachi High-Tech Corporation, Tokyo (JP)

(72) Inventors: Ayako Watahiki, Tokyo (JP); Osamu Watabe, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 539 days.

(21) Appl. No.: 18/277,109

(22) PCT Filed: Jan. 25, 2022

(86) PCT No.: PCT/JP2022/002718
§ 371 (c)(1),
(2) Date: Aug. 14, 2023

(87) PCT Pub. No.: WO2022/185788
PCT Pub. Date: Sep. 9, 2022

(65) Prior Publication Data

US 2024/0125810 A1 Apr. 18, 2024

(30) Foreign Application Priority Data

Mar. 3, 2021 (JP) ................................. 2021-033797

(51) Int. Cl.
*G01N 35/04* (2006.01)
*G01N 35/00* (2006.01)

(52) U.S. Cl.
CPC ....... *G01N 35/04* (2013.01); *G01N 35/00584* (2013.01); *G01N 2035/0401* (2013.01)

(58) Field of Classification Search
CPC ............. G01N 35/04; G01N 35/00584; G01N 2035/0401; G16H 10/40; G16H 40/40; G16H 40/63
See application file for complete search history.

(56) References Cited

U.S. PATENT DOCUMENTS

2019/0212262 A1* 7/2019 Matsuoka ........ G01N 35/00594
2022/0034923 A1* 2/2022 Yagi ....................... G01N 35/04
2022/0147038 A1* 5/2022 Akutsu ............ G01N 35/00623

FOREIGN PATENT DOCUMENTS

JP 2003-177136 A 6/2003
JP 2010-223818 A 10/2010
(Continued)

OTHER PUBLICATIONS

International Preliminary Report on Patentability issued on Aug. 29, 2023 for PCT International Application No. PCT/JP2022/002718.
(Continued)

*Primary Examiner* — Jennifer Wecker
*Assistant Examiner* — Britney N. Washington
(74) *Attorney, Agent, or Firm* — Volpe Koenig

(57) ABSTRACT

An automatic analysis system includes: a plurality of automatic analyzers; a conveyance line connected to the analyzers; and a computer configured to control the conveyance line to distribute a sample to the automatic analyzers. Each of the automatic analyzers includes a first component that is constantly used and a second component that is intermittently used. The computer is configured to compare a usage time of the first component of each automatic analyzer with a set time, select, when the usage time of the first component of any one of the plurality of automatic analyzers exceeds the set time, the automatic analyzer in which the usage time of the first component exceeds the set time as a prioritized device, and control the conveyance line such that a sample used for analysis in the second component is conveyed to the prioritized device in preference to another automatic analyzer.

7 Claims, 9 Drawing Sheets

(56) References Cited

FOREIGN PATENT DOCUMENTS

| | | | |
|---|---|---|---|
| JP | 2017-146264 | A | 8/2017 |
| WO | 2018/051671 | A1 | 3/2018 |

OTHER PUBLICATIONS

International Search Report, PCT/JP2022/002718, Mar. 15, 2022.

* cited by examiner

FIG. 7

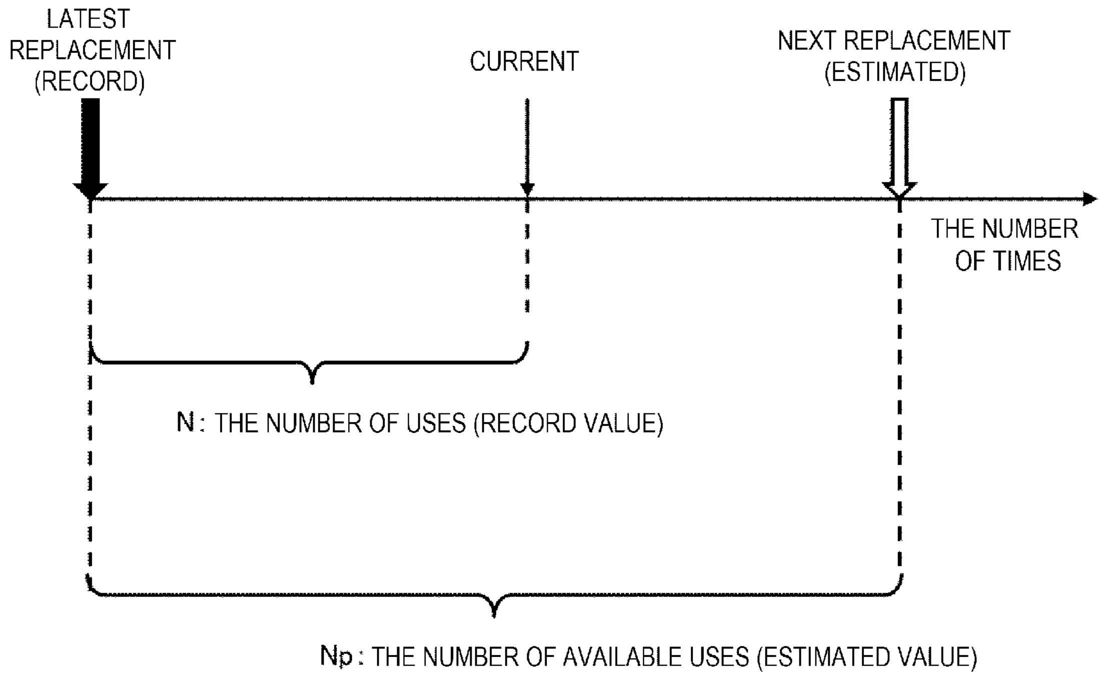

FIG. 8

| MAINTENANCE ITEM | RECOMMENDED EXECUTION TIMING | OUTLINE |
|---|---|---|
| THERMOSTATIC OVEN CLEANING | A MONTHS | CLEAN OVEN FOR HEATING REACTION CONTAINER |
| LIGHT SOURCE LAMP REPLACEMENT | B HOURS | REPLACE MECHANISM SERVING AS LIGHT SOURCE |
| REACTION CELL REPLACEMENT | WHEN DIRT THAT CANNOT BE CLEANED OCCURS | REPLACE CONTAINER TO WHICH REAGENT AND BIOLOGICAL SAMPLE ARE DISCHARGED |
| SAMPLE PROBE CLEANING | C TIMES | CLEAN MECHANISM FOR ASPIRATING BIOLOGICAL SAMPLE |
| PROBE REPLACEMENT | WHEN CLOGGED BY ASPIRATED SUBSTANCE | REPLACE SAMPLE PROBE OR REAGENT PROBE |

AUTOMATIC ANALYSIS SYSTEM AND SAMPLE DISTRIBUTION METHOD

TECHNICAL FIELD

The present invention relates to an automatic analysis system including a plurality of automatic analyzers, and a sample distribution method.

BACKGROUND ART

In an automatic analysis system including a plurality of automatic analyzers, a plurality of automatic analyzers perform analysis in parallel, and thus many samples can be processed in a short time. Patent Literature 1 discloses that the distribution of a sample to each automatic analyzer is determined based on a load status and a reagent remaining amount of the automatic analyzer.

CITATION LIST

Patent Literature

PTL 1: JP2003-177136A

SUMMARY OF INVENTION

Technical Problem

In the automatic analysis system, various components such as a light source lamp and a reaction cell are used in individual automatic analyzers. For these components, it is necessary to perform maintenance such as cleaning, repair, and replacement regularly or timely. The maintenance is a burden on a user, and also every time the maintenance is performed, the automatic analyzers need to be stopped, causing a decrease in analysis processing efficiency of the sample.

An object of the invention is to provide an automatic analysis system and a sample distribution method capable of reducing a stop frequency of an automatic analyzer associated with maintenance, reducing a burden on a user, and improving analysis processing efficiency of a sample.

Solution to Problem

In order to achieve the object, the invention provides an automatic analysis system including: a plurality of automatic analyzers; a conveyance line connected to the plurality of automatic analyzers; and a computer configured to control the conveyance line to distribute a sample to the plurality of automatic analyzers. Each of the plurality of automatic analyzers includes a first component that is constantly used during operation and a second component that is intermittently used. The computer is configured to compare a usage time of the first component of each automatic analyzer with a set time, select, when the usage time of the first component of any one of the plurality of automatic analyzers exceeds the set time, the automatic analyzer in which the usage time of the first component exceeds the set time as a prioritized device, and control the conveyance line such that a sample used for analysis in the second component is conveyed to the prioritized device in preference to another automatic analyzer.

Advantageous Effects of Invention

According to the invention, it is possible to reduce a stop frequency of an automatic analyzer associated with maintenance, reduce a burden on a user, and improve analysis processing efficiency of a sample.

BRIEF DESCRIPTION OF DRAWINGS

FIG. 7 is a diagram illustrating a utilization rate of a reaction cell.

FIG. 8 illustrates rules of maintenance items of management target components.

DESCRIPTION OF EMBODIMENTS

Hereinafter, embodiments of the invention will be described with reference to the drawings.

—Automatic Analysis System—

Figure 1:
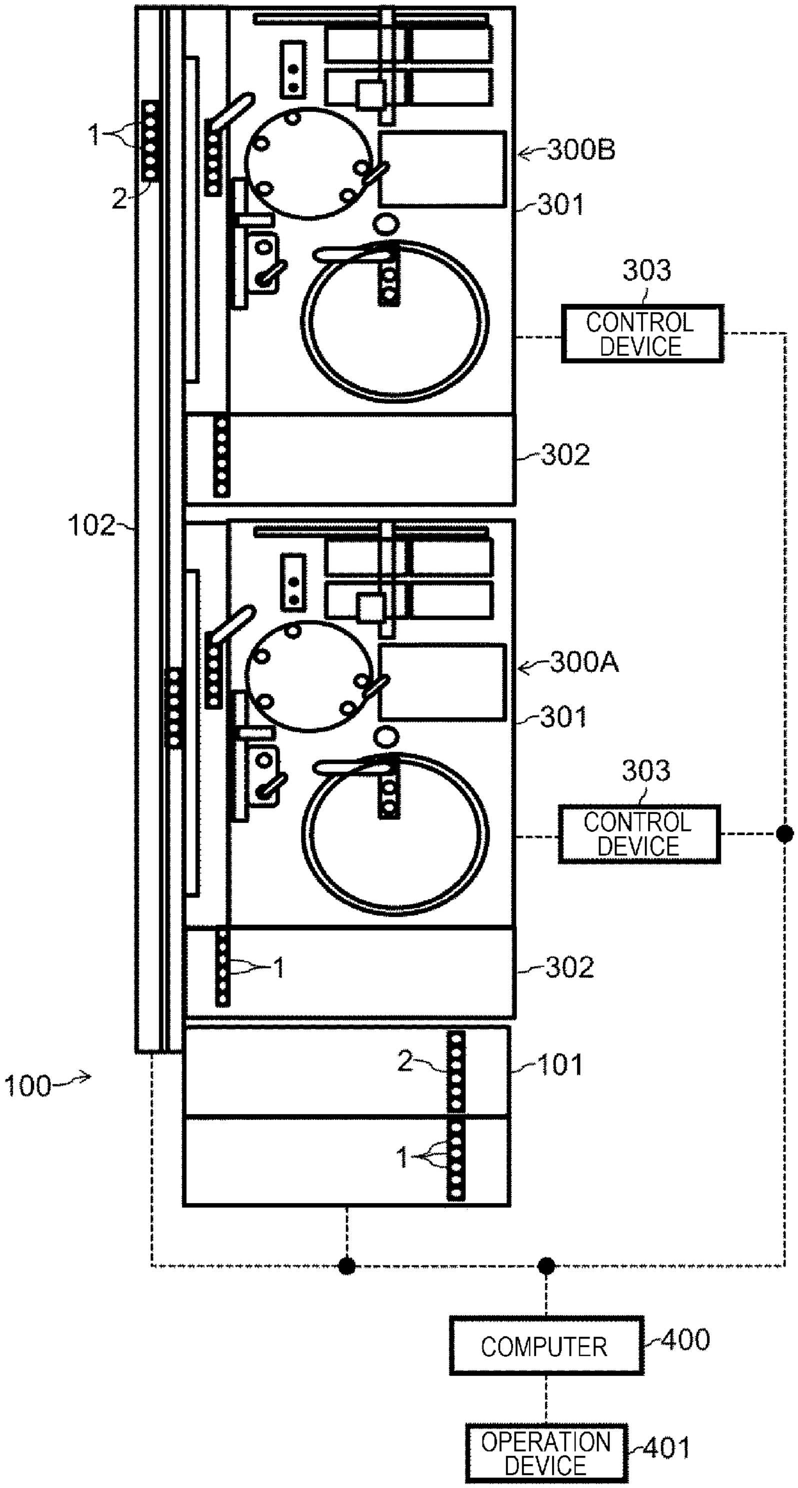
FIG. 1 is a schematic diagram of an automatic analysis system according to an embodiment of the invention.

FIG. 1 is a schematic diagram of an automatic analysis system according to an embodiment of the invention. The automatic analysis system shown in FIG. 1 includes a conveyance line 100, a plurality of automatic analyzers 300A and 300B, and a computer 400. Although an automatic analysis system including two automatic analyzers 300A and 300B is described as an example in the embodiment, the invention may be applied to an automatic analysis system including three or more automatic analyzers.

The conveyance line 100 is a unit that is connected to both of the automatic analyzers 300A and 300B, conveys a sample to the automatic analyzers 300A and 300B, and collects the sample from the automatic analyzers 300A and 300B. The conveyance line 100 includes a sampler unit 101 and a conveyance unit 102. The sampler unit 101 is a unit configured to take in and take out a sample with respect to the automatic analysis system, and accommodates a plurality of sample racks 2 in which a plurality of sample containers 1 containing a sample of a patient are placed, and delivers and receives the sample rack 2 to and from the conveyance unit 102. The sample container 1 contains a sample (biological sample) of a patient, such as blood or urine. Some sample containers 1 may contain a standard solution for creating a calibration curve or a sample for quality control. The conveyance unit 102 selectively supplies a sample shipped out from the sampler unit 101 to the automatic analyzers 300A and 300B, or stores the sample containers 1 (sample rack 2) collected from the automatic analyzers 300A and 300B into the sampler unit 101.

The automatic analyzers 300A and 300B are units each configured to perform predetermined analysis (for example, biochemical analysis and ISE analysis) on the sample contained in the sample container 1, and each include a buffer unit 302, a control device 303, and the like in addition to an analyzer main body 301. The analyzer main body 301 (described later) is a mechanical unit configured to perform an analysis operation on a sample. The buffer unit 302 is a unit configured to transfer the sample rack 2 to and from the conveyance unit 102 and temporarily puts the sample rack 2 on standby, and is installed adjacent to the analyzer main body 301. The control device 303 is a computer including a CPU, a RAM, a ROM, and the like, and controls the analyzer main body 301 and the buffer unit 302 according to a signal from the computer 400 that is a host control device.

The computer 400 controls the sampler unit 101, the conveyance unit 102, and the automatic analyzers 300A and 300B based on data input by a user (operator or the like) using an operation device 401 or based on a predetermined program. For example, the sampler unit 101 and the conveyance unit 102 are controlled by the computer 400 based on an analysis request item and analysis order data, and the sample container 1 loaded into the automatic analysis system is distributed (allocated) to the automatic analyzers 300A and 300B. Based on input data from the computer 400, the analyzer main bodies 301 of the automatic analyzers 300A and 300B are controlled by the control devices 303, respectively, and analysis operations on the sample are performed in parallel in the analyzer main bodies 301. The sample container 1 subjected to the sample analysis is transferred to the conveyance unit 102, and returned to the sampler unit 101 by the conveyance unit 102 that is controlled by the computer 400.

The operation device 401 includes an input device such as a keyboard, a mouse, or a touch panel, and a display device such as a monitor.

—Automatic Analyzer—

Figure 2:
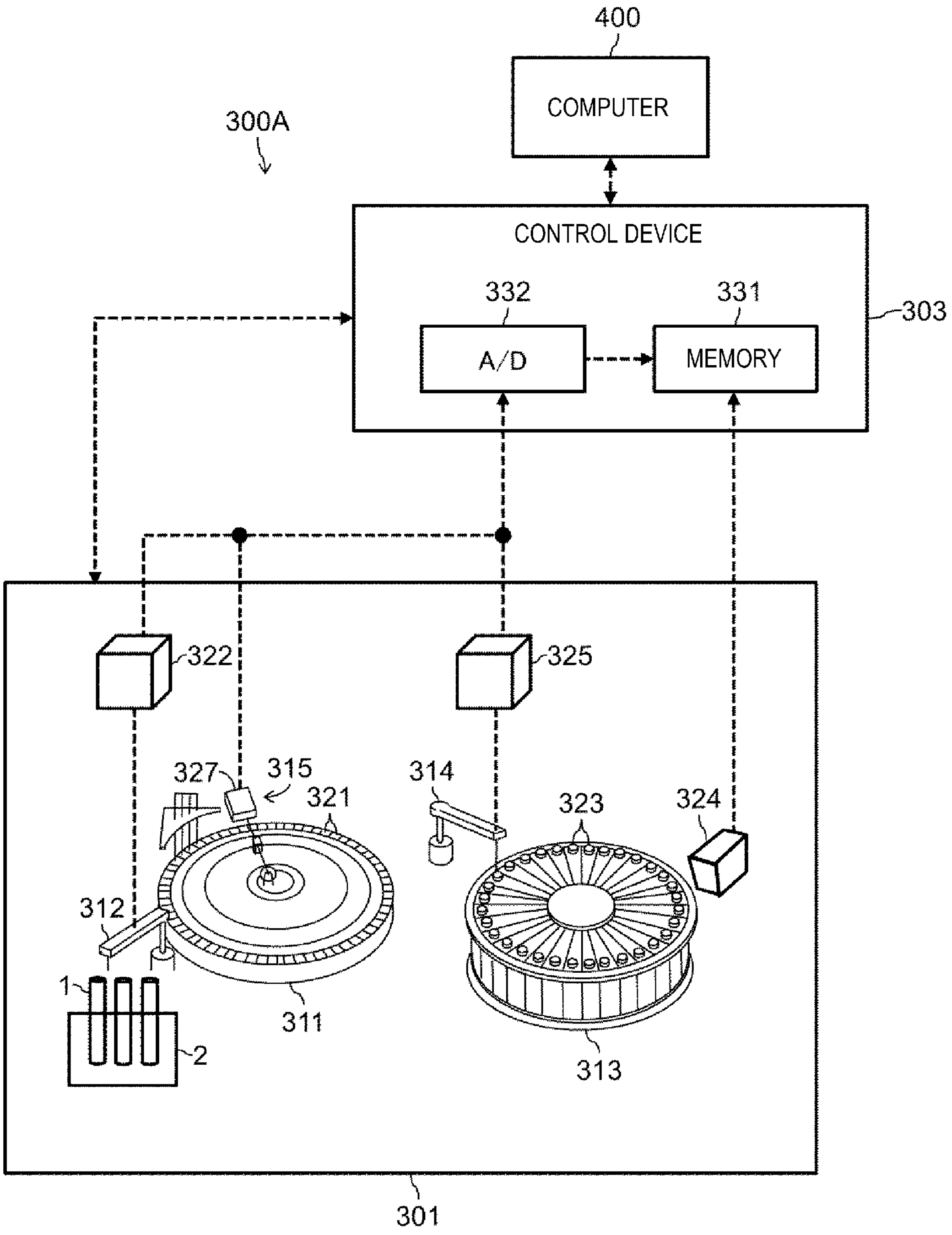
FIG. 2 is a schematic diagram in which main parts of each automatic analyzer provided in the automatic analysis system in FIG. 1 are extracted and shown.
Figure 3:
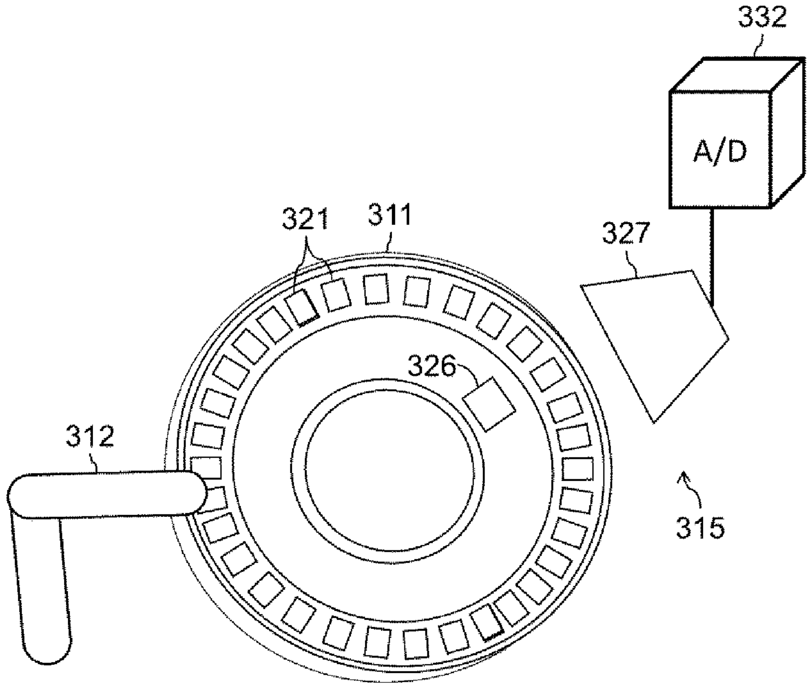
FIG. 3 is a schematic diagram in which a reaction disk and relevant elements thereof provided in the automatic analyzer in FIG. 2 are extracted and shown.

FIG. 2 is a schematic diagram in which main parts of each automatic analyzer provided in the automatic analysis system in FIG. 1 are extracted and shown. FIG. 3 is a schematic diagram in which a reaction disk and relevant elements thereof provided in the automatic analyzer are extracted and shown. In FIG. 2, the buffer unit 302 is not shown. Here, although a configuration of the automatic analyzer 300A will be described with reference to FIGS. 2 and 3, the automatic analyzer 300B has a configuration similar to that of the automatic analyzer 300A, and the automatic analyzers 300A and 300B share the same measurement principle, components to be used, and the like of analysis items.

The analyzer main body 301 of the automatic analyzer 300A includes a reaction disk 311, a sample dispensing mechanism 312, a reagent disk 313, a reagent dispensing mechanism 314, and a biochemical measurement device 315.

The reaction disk 311 is a turn-table-shaped device that rotates around a vertical axis. Many reaction cells 321 made of a transparent material are installed at an outer peripheral portion of the reaction disk 311, and these reaction cells 321 form an annular row. The reaction cell is a disposable container made of a chemical resistant resin, elongated in an up-down direction, and opening in an upper portion. A temperature of the reaction disk 311 is adjusted to a set temperature (for example, about 37° C.) by a thermostatic oven (not shown), and the reaction disk 311 intermittently rotates during operation of the automatic analyzer 300A to move a predetermined one of the reaction cells 321 to a predetermined position (such as a position where the sample is dispensed).

The sample dispensing mechanism 312 is a mechanism configured to dispense a sample or the like from the sample container 1 to the reaction cell 321, and is positioned between the reaction disk 311 and an aspiration position (a position of the sample rack 2 in FIG. 2). The sample dispensing mechanism 312 includes a movable arm and a pipette nozzle (probe) attached to the movable arm, and allows the pipette nozzle to perform a rotational movement in a horizontal direction and a parallel movement in the up-down direction. With this configuration, the sample dispensing mechanism 312 aspirates a predetermined amount of sample by inserting the pipette nozzle into the target sample container 1 in the sample rack 2 moved to the aspiration position, and discharges the sample to the predetermined reaction cell 321 moved to a predetermined position by the rotation of the reaction disk 311. The sample dispensing operation of the sample dispensing mechanism 312 is executed while a liquid level detector 322 detects a liquid level inside the sample container 1 or the reaction cell 321. Although not particularly shown, a cleaning tank for cleaning the pipette nozzle of the sample dispensing mechanism 312 is installed on a moving path of the pipette nozzle of the sample dispensing mechanism 312, and the pipette nozzle of the sample dispensing mechanism 312 can be cleaned in the cleaning tank.

The reagent disk 313 is a turn-table-shaped device that rotates around the vertical axis. Many reagent containers 323 are installed at an outer peripheral portion of the reagent disk 313, and these reagent containers 323 form an annular row. The reagent disk 313 serves as a reagent storage, and has a function of cold-insulating a stored reagent solution. A label displaying reagent identification information (for example, bar code) is attached to each reagent container 323, and each reagent container 323 contains a reagent solution used for measurement of an analysis item. A reagent ID reader 324 is installed at a position on an outer peripheral side of the reagent disk 313. The reagent identification information attached to the reagent container 323 is read by the reagent ID reader 324, and the read data of the reagent solution is output to the control device 303 together with data of a position of the reagent container 323 in the reagent disk 313. The data input to the control device 303 is registered in a memory 331 of the control device 303.

The reagent dispensing mechanism 314 is a mechanism for dispensing a reagent solution from the reagent container 323 to the reaction cell 321. The reagent dispensing mechanism 314 is positioned between the reaction disk 311 and the reagent disk 313, and similarly to the sample dispensing mechanism 312, includes a movable arm and a pipette nozzle (probe) attached to the movable arm. The reagent dispensing mechanism 314 aspirates a predetermined amount of the reagent solution by inserting the pipette nozzle into the target reagent container 323 moved to an aspiration position by the rotation of the reagent disk 313, and discharges the reagent solution to a predetermined one of the reaction cells 321 moved to a predetermined position by the rotation of the reaction disk 311. The reagent solution dispensing operation of the reagent dispensing mechanism 314 is also performed while a liquid level detector 325 detects a liquid level. Although not particularly shown, a cleaning tank for cleaning the pipette nozzle of the reagent dispensing mechanism 314 is installed on a moving path of the pipette nozzle of the reagent dispensing mechanism 314, and the pipette nozzle of the reagent dispensing mechanism 314 can be cleaned in the cleaning tank.

The biochemical measurement device 315 is a device configured to analyze a biochemical component of the sample, and is disposed close to the reaction cell 321 set on the reaction disk 311. The biochemical measurement device 315 includes a light source lamp 326 (FIG. 3), a photometer 327, and the like. The light source lamp 326 is disposed inside the annular row of the reaction cells 321, and the photometer 327 is disposed outside the annular row of the reaction cells 321. Inspection light emitted from the light source lamp 326 is transmitted through the reaction cell 321 containing a sample, and the transmitted light transmitted through the reaction cell 321 or scattered light is measured by the photometer 327. During the operation of the automatic analyzer 300A, the light source lamp 326 is constantly energized, and a reaction liquid of the sample and the reagent solution inside each reaction cell 321 is subjected to light measurement whenever passing between the light source lamp 326 and the photometer 327. An analog signal output from the photometer 327 accompanying the light measurement is input to the control device 303, converted into a digital signal by an A/D converter 332, and recorded in the memory 331. The reaction cell 321, whose measurement is completed, has an inside thereof cleaned by a reaction cell cleaning mechanism (not shown) disposed in the vicinity of the reaction disk 311, and is repeatedly used.

Although a detailed description is omitted, the automatic analyzer 300A further includes an agitating mechanism (for example, an ultrasonic agitating mechanism) configured to agitate a sample and a reagent solution dispensed into the reaction cell 321, an ISE analyzer configured to measure an electrolyte concentration in the sample using an ion selective electrode, and the like.

—Computer—

Figure 4:
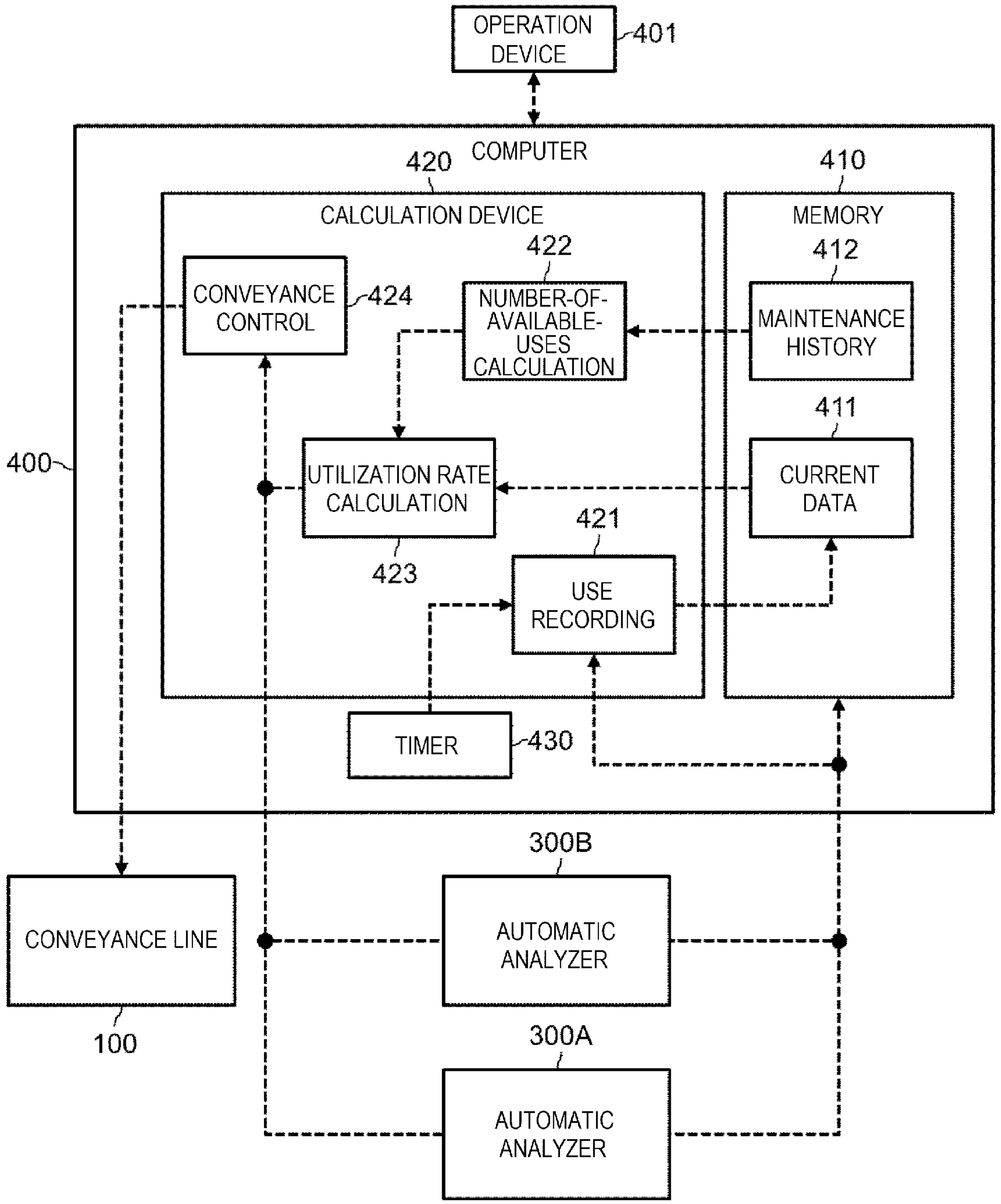
FIG. 4 is a functional block diagram illustrating main functional parts of a computer provided in the automatic analysis system in FIG. 1.

FIG. 4 is a functional block diagram illustrating main functional parts of the computer provided in the automatic analysis system in FIG. 1. In FIG. 4, a control function for the conveyance line 100 implemented by the computer 400 is extracted and shown, and control functions for the automatic analyzers 300A and 300B are omitted. The computer 400 illustrated in FIG. 4 includes a memory (storage device) 410, a calculation device (CPU or the like) 420, a timer 430, and the like. The computer 400 may be directly connected to the conveyance line 100 and the automatic analyzers 300A and 300B in a wired or wireless manner, or may be connected to the conveyance line 100 and the automatic analyzers 300A and 300B via a network.

The memory 410 stores current data 411, a maintenance history 412, and the like of components used in the automatic analyzers 300A and 300B.

The current data 411 is, for example, a data table in which a use status of a currently used management target component in each of the automatic analyzers 300A and 300B is recorded for each item. The management target component is a component provided in each of the automatic analyzers 300A and 300B, and is a component, whose use status is to be managed, including consumables. The management target component is roughly divided into a first component that is constantly used during operation and a second component that is intermittently used. In the case of the embodiment, the automatic analyzers 300A and 300B share an analysis principle and management target components (the first component and the second component). For the first component, a usage time is recorded as the use status. For the second component, the number of uses is recorded as the use status. Data of the use status (the usage time or the number of uses) recorded in the current data 411 is updated by addition, as needed, by use recording 421 (described later) of the calculation device 420.

The first component "being constantly used" described above means that the first component is always used in a constant state during the operation of the automatic analyzer 300A or 300B. A representative example of the first component is the light source lamp 326 that emits inspection light for irradiation of the reaction cell 321. The light source lamp 326 is constantly energized to continuously emit light during operation of the automatic analyzer 300A or 300B to which the light source lamp 326 is assembled. In addition, the thermostatic oven for keeping the reaction disk 311 at an appropriate temperature is also an example of the first component.

The second component "being intermittently used" means that the second component is repeatedly used in a predetermined cycle. A representative example of the second component is the reaction cell 321 in which a sample is dispensed. The reaction cell 321 is repeatedly used in a series of cycles each including reception of a sample and a reagent solution, measurement of an analysis item, discharge of a mixture of the sample and the reagent solution, and cleaning. In addition, the pipette nozzle used repeatedly in aspiration and discharge of a sample, a reagent solution or a cleaning solution is also an example of the second component.

The maintenance history 412 is, for example, a data table in which a maintenance history is recorded for each item of the management target component used in each of the automatic analyzers 300A and 300B. In the maintenance history 412, history data such as a replacement date and time of a management target component such as the reaction cell 321 of the automatic analyzer 300A is recorded. The history data is input from the operation device 401 by the user, for example.

The calculation device 420 has a function of executing processing including the use recording 421, number-of-available-uses calculation 422, utilization rate calculation 423, and conveyance control 424.

The use recording 421 is processing of recording use statuses of a first component and a second component. In the processing of the use recording 421, the computer 400 measures a usage time of a first component (for example, a cumulative usage time of the light source lamp 326) used in each of the automatic analyzers 300A and 300B. The computer 400 counts the number of uses of a second component (for example, a cumulative number of uses of the reaction cell 321) used in each of the automatic analyzers 300A and 300B.

A usage time of the currently used first component can be measured by measuring an operating time of each of the automatic analyzers 300A and 300B after replacement (after being assembled to each of the automatic analyzer 300A or 300B) counted by the timer 430. In this case, a start point of the usage time of the first component can be determined based on data of a replacement date and time of the first component recorded in the maintenance history 412.

As the number of uses of the currently used second component, the number of times of measurement operations of an analysis item of a sample, for example, the number of times of liquid level detection of the liquid level detector 322 or 325 can be counted based on a signal from each of the automatic analyzers 300A and 300B (or a signal to each of the automatic analyzers 300A and 300B). In this case, a start point of a period in which the number of uses of the second component is counted can be determined based on data of a replacement date and time of the second component recorded in the maintenance history 412. In addition, the number of uses of the second component can be measured by counting the number of times of dispensing operations of a sample or a reagent solution (operation commands to a syringe) or the number of times of cleaning operations of the pipette nozzle (operation commands to the reaction disk 311) based on data from each of the automatic analyzers 300A and 300B. The use status of the currently used first component or second component measured in the use recording 421 is recorded in the memory 410 as the current data 411.

The number-of-available-uses calculation 422 is processing of calculating a reference of the number of available uses of a predetermined second component based on the maintenance history 412 of the second component read from the memory 410. Taking the reaction cell 321 as an example, replacement necessity of the reaction cell 321 is determined by a test called cell blank measurement (FIG. 5) performed at a predetermined interval during operation in each of the automatic analyzers 300A and 300B. Therefore, the number of actual uses of the second component can be increased or decreased until the reaction cell 321 is replaced. Therefore, in the processing of the number-of-available-uses calculation 422, the calculation device 420 first collects statistics of a maintenance interval (replacement interval) of the reaction cell 321 based on the maintenance history 412 recorded in the memory 410. Based on an expected use period of the reaction cell 321 derived from the statistics, the number of uses of the currently used reaction cell 321 from when being assembled to when being replaced is estimated, and the estimated number of uses is calculated as the number of available uses of the reaction cell 321. An example of the reaction cell 321 is described, but in a case of a second component to which a rule of replacing the second component after the second component is simply used a fixed number of times without performing a test is applied, the number of available uses is set to a set value (fixed value).

Figure 9:
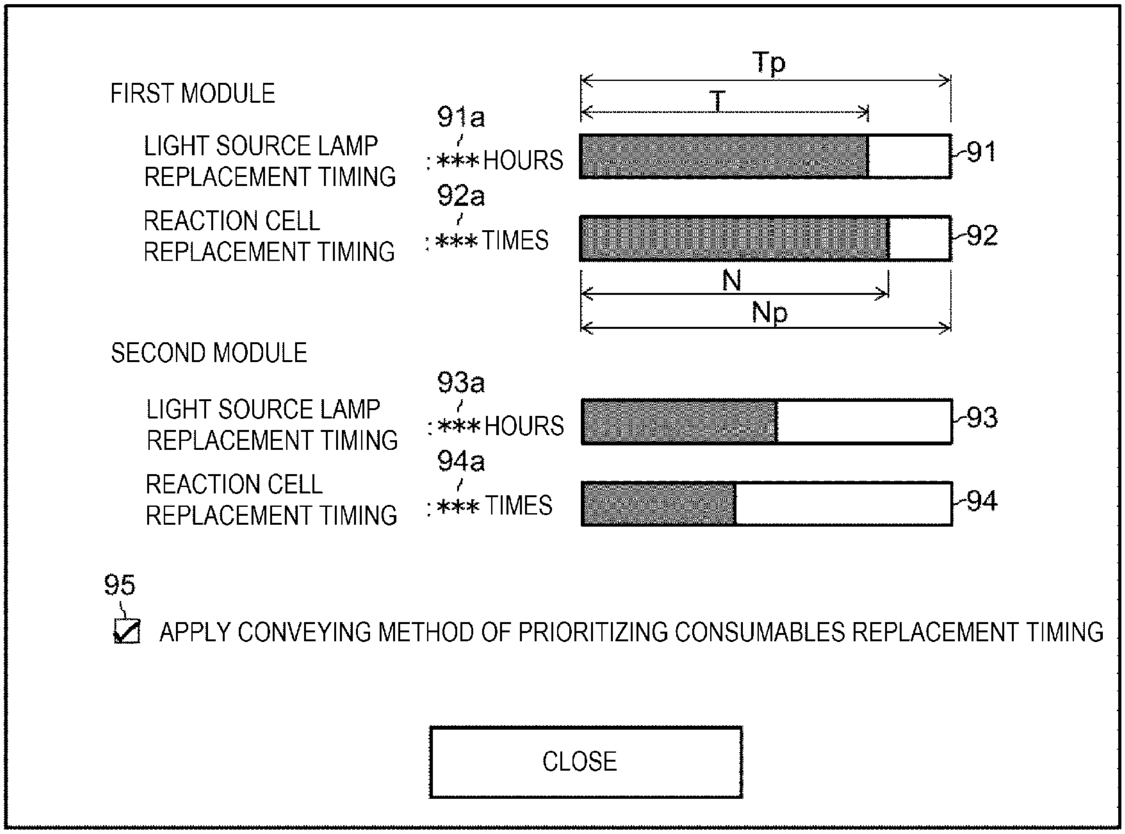
FIG. 9 is a diagram illustrating an example of a screen displaying utilization rates of management target components.

The utilization rate calculation 423 is processing of calculating a utilization rate (a consuming rate of the number of available uses or an available usage time) of each of the currently used first component and second component in each of the automatic analyzers 300A and 300B. In a case of a first component to be subjected to maintenance (for example, replacement) when the first component is used for a preset available usage time, a ratio of a current usage time to the available usage time is calculated in the processing of the utilization rate calculation 423 (FIG. 9). In a case of a second component, in the processing of the utilization rate calculation 423, a ratio of the current number of uses of the reaction cell 321 to the number of available uses is calculated (FIG. 9).

Figure 10:
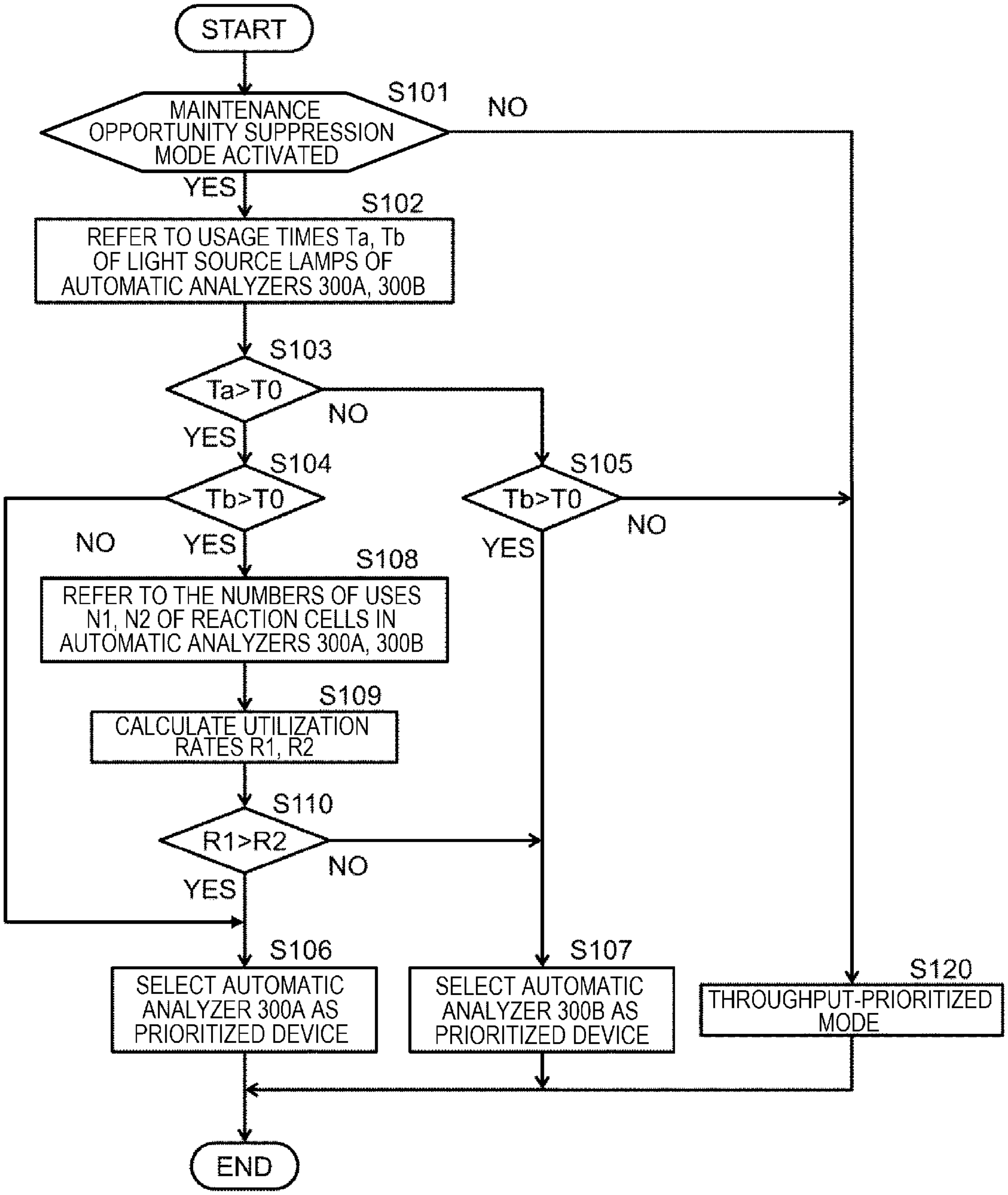
FIG. 10 is a flowchart illustrating a procedure of sample distribution operations performed on a plurality of automatic analyzers by the computer.
Figure 11:
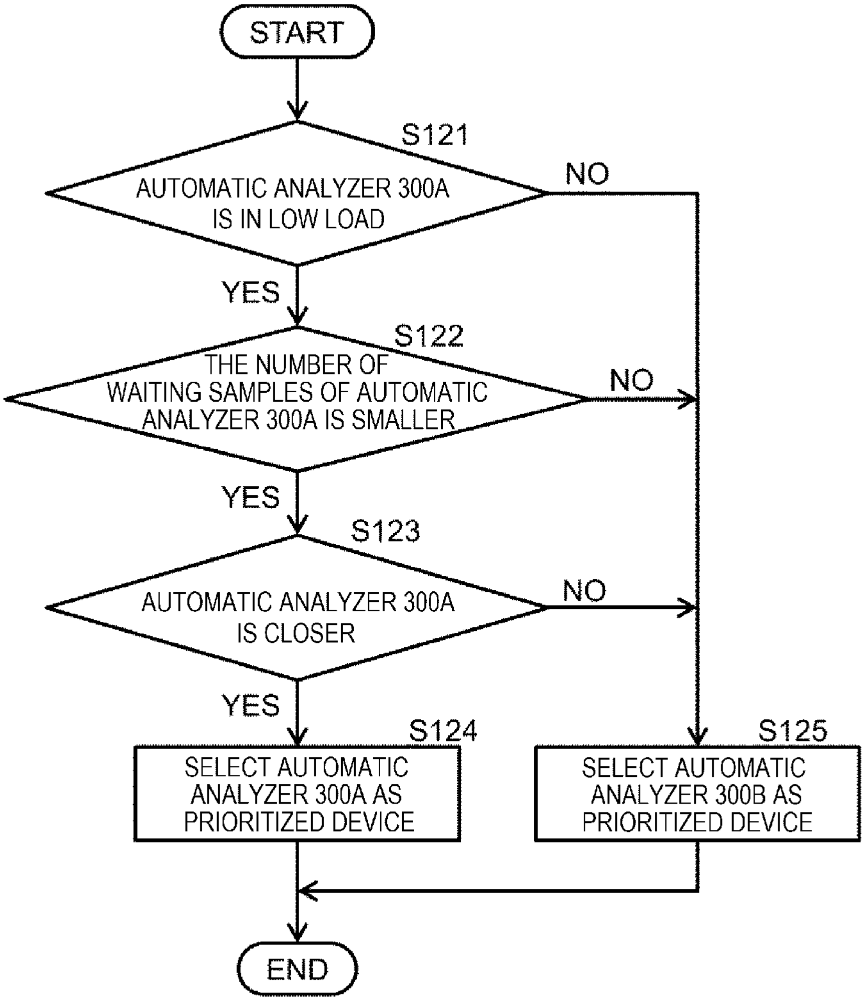
FIG. 11 is a flowchart illustrating a procedure of sample distribution operations performed on a plurality of automatic analyzers by the computer when a maintenance opportunity suppression mode is inactivated.

The conveyance control 424 is processing of determining allocation of a sample to each of the automatic analyzers 300A and 300B and controlling the conveyance line 100, according to an operation signal from the operation device 401 and utilization rates of a first component and a second component (FIGS. 10 and 11).

—Cell Blank Measurement—

Figure 5:
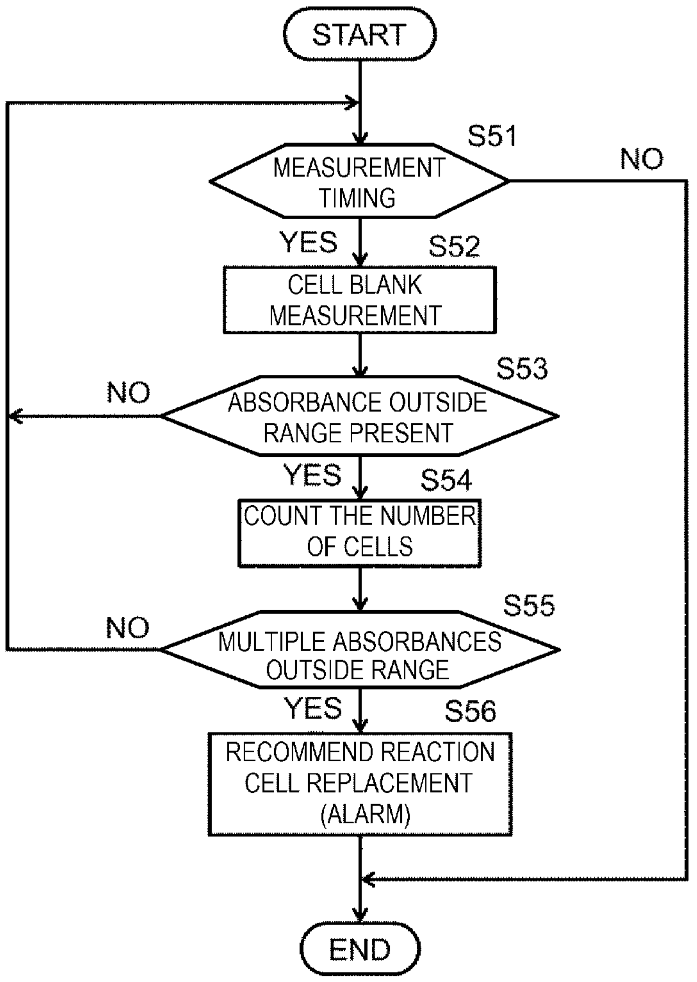
FIG. 5 is a flowchart illustrating an example of a processing procedure of cell blank measurement for determining replacement necessity of a reaction cell.

FIG. 5 is a flowchart illustrating an example of a processing procedure of the cell blank measurement for determining replacement necessity of a reaction cell.

(Step S51)

As described above, in each of the automatic analyzers 300A and 300B, at a predetermined interval (for example, every predetermined time or every predetermined number of times of sample analysis) between analysis operations of a sample, a test called cell blank measurement is performed to determine the replacement necessity of the reaction cell 321. While the automatic analyzers 300A and 300B are in operation, the control device 303 or the computer 400 determines whether a predetermined measurement timing arrives, based on, for example, an operating time or the number of times of analysis execution (Step S51). If the measurement timing does not arrive, the control device 303 or the computer 400 instructs the automatic analyzers 300A and 300B to continue the analysis operation and returns the procedure to step S51. If the measurement timing arrives, the control device 303 or the computer 400 instructs interruption of the analysis operation and advances the procedure to step S52 (cell blank measurement). Hereinafter, a case where a measurement timing of the reaction cell 321 in the automatic analyzer 300A arrives will be described as an example, and the processing of step S52 and subsequent steps will be described.

(Step S52)

In the cell blank measurement, a liquid (here, water is assumed) having a known measurement value is dispensed into all the reaction cells 321, the inspection light is applied, and an absorbance is measured for each reaction cell 321. In dispensing of the water into each reaction cell 321, for example, a method may be adopted in which water prepared in the predetermined reagent container 323 or the sample container 1 is dispensed into each reaction cell 321 by the reagent dispensing mechanism 314 or the sample dispensing mechanism 312. When water is used for cleaning the pipette nozzle, water used in the cleaning mechanism may be dispensed into each reaction cell 321.

(Steps S53 and S54)

In the subsequent step S53, the control device 303 or the computer 400 compares the absorbance, which is obtained by the cell blank measurement for each reaction cell 321, with a reference range (an upper limit and a lower limit) set in advance and stored in the memory, and determines presence or absence of a value deviated from the reference range. In this determination, if all the values of the absorbance for the reaction cells 321 fall within the reference value (equal to or greater than the upper limit and equal to or smaller than the lower limit), the control device 303 or the computer 400 instructs the automatic analyzer 300A to restart the analysis operation, and returns the procedure to step S51. On the other hand, if any absorbance deviated from the reference range (smaller than the lower limit or larger than the upper limit) is measured, the control device 303 or the computer 400 advances the procedure to step S54, and counts the number of reaction cells 321 whose values of absorbance are deviated from the reference range.

(Steps S55 and S56)

In the subsequent step S55, the control device 303 or the computer 400 determines whether there are a plurality of values of the absorbance deviated from the reference range. In this determination, if there is only one value of the absorbance deviated from the reference range, the control device 303 or the computer 400 instructs the automatic analyzer 300A to restart the analysis operation, and returns the procedure to step S51. On the other hand, if there are a plurality of values of the absorbance deviated from the reference range, the control device 303 or the computer 400 advances the procedure to step S56, outputs an alarm recommending simultaneous replacement of the reaction cells 321 to an output device (for example, a monitor of the operation device 401), and ends the flow in FIG. 5. In the embodiment, taking an error and the like in measurement value of the absorbance into consideration, if there is one or less reaction cell whose measurement value is deviated from the reference range, the control device 303 or the computer 400 determines that the replacement of the reaction cell 321 is not necessary. However, the number of defective reaction cells, which is used as a determination reference for the alarm output in step S55, can be changed.

When all the reaction cells 321 are replaced in response to the alarm and a signal notifying completion of the replacement of the reaction cell 321 is input by a predetermined operation, the replacement date and time of the reaction cell 321 is registered in the maintenance history 412. After the replacement of the reaction cell 321, the flow in FIG. 5 is executed again for the automatic analyzer 300A as the analysis operation of the automatic analyzer 300A is restarted.

—Estimation of Use Period of Reaction Cell—

Figure 6:
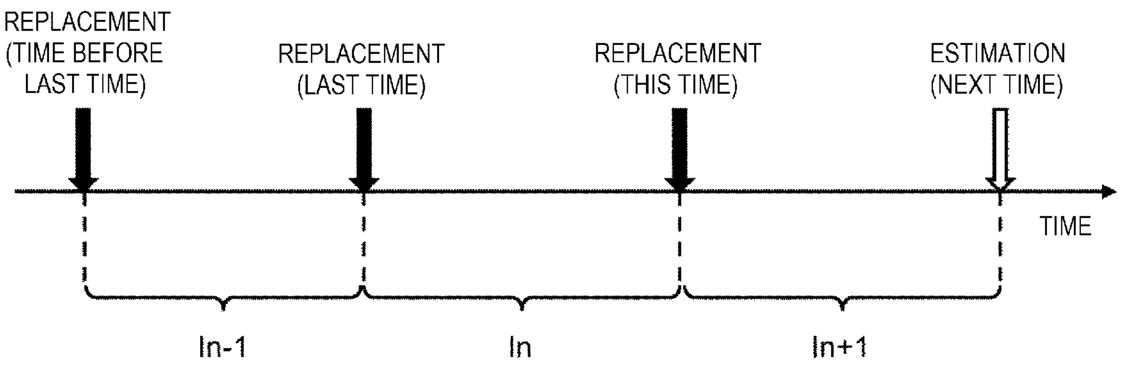
FIG. 6 is a diagram illustrating a replacement date and time of the reaction cell on a time axis.

FIG. 6 is a diagram illustrating a replacement date and time of the reaction cell on a time axis. A replacement history of the reaction cell 321 shown in FIG. 6 is assumed to be that of the automatic analyzer 300A, and the following description is common to the automatic analyzer 300B. In the computer 400, as described above, the replacement date and time of the reaction cell 321 is registered in the maintenance history 412 and stored in the memory 410. In the processing of the number-of-available-uses calculation 422 performed by the calculation device 420, the number of available uses of the reaction cell 321 (second component currently used) newly assembled to the automatic analyzer 300A by replacement is calculated based on the maintenance history 412 read from the memory 410. Specifically, for example, in the automatic analyzer 300A, record values I1, I2, . . . , In of the replacement intervals of the reaction cell 321 in the latest predetermined number of times n are calculated based on the replacement date and time of the reaction cell 321. The record values I1, I2, . . . , to In are collected as statistics (for example, averaged) by the calculation device 420, and an expected use period In+1 of the reaction cell 321 newly assembled to the automatic analyzer 300A is calculated. In the processing of the number-of-available-uses calculation 422 performed by the calculation device 420, the number of available uses of the new reaction cell 321 is further calculated based on the expected use period In+1. The number of available uses can be obtained by, for example, calculating a record value of the number of times of analysis execution per unit time in a latest predetermined period in the automatic analyzer 300A based on storage data of the memory 410, and calculating the number of times of analysis execution in the expected use period In+1 at the same pace as the record value.

—Estimation of Utilization Rate of Reaction Cell—

FIG. 7 is a diagram illustrating a utilization rate of the reaction cell. The number of times indicated by a horizontal axis in FIG. 7 represents the number of uses of one set of the reaction cells 321 currently used in the automatic analyzer 300A under an assumption that all the reaction cells 321 of the automatic analyzer 300A (the same applies to the automatic analyzer 300B) are replaced simultaneously as one set. In other words, the horizontal axis in FIG. 7 corresponds to the number of analysis execution using the currently used reaction cells 321 (all as one set) in the automatic analyzer 300A.

In FIG. 7, it is assumed that a next alarm requesting replacement of the reaction cell 321 is output in the cell blank measurement when the currently used reaction cell 321 is used for the number of available uses Np calculated as described above. In this case, when the current number of uses of the currently used reaction cell 321 is defined as N, a value of 100×N/Np is calculated as an estimated value of a utilization rate R (%) of the reaction cell 321 in the processing of the utilization rate calculation 423 performed by the calculation device 420. When the utilization rate R is 100%, the next replacement of the reaction cell 321 is assumed. The number of available uses Np and the number of uses N both are not the number of uses of each individual reaction cell 321, but values under a concept that all the currently used reaction cells 321 are regarded as one set, similarly to the horizontal axis in FIG. 7.

—Utilization Rate of Other Management Target Components—

In the processing of the utilization rate calculation 423 performed by the calculation device 420, not only the utilization rate of the currently used reaction cell 321 but also utilization rates of other management target components are calculated. However, the calculation of the utilization rates of the management target components varies slightly depending on a management reference.

FIG. 8 illustrates rules of maintenance items of the management target components. In the example in FIG. 8, it is ruled that the thermostatic oven configured to keep the reaction disk 311 at an appropriate temperature should be cleaned every A month(s) (predetermined fixed period). An elapsed period from previous cleaning of the thermostatic oven can be measured by a timer of the computer 400 or the control device 303. It is ruled that the light source lamp 326 should be replaced when a usage time reaches a B time (available usage time). The usage time of the light source lamp 326 corresponds to an operating time of the automatic analyzer 300A (or the automatic analyzer 300B) after the light source lamp 326 is attached to the automatic analyzer 300A (or the automatic analyzer 300B). The usage time of the light source lamp 326 can also be measured by the timer of the computer 400 or the control device 303. The thermostatic oven and the light source lamp 326 are first components constantly used during operation of the automatic analyzers 300A and 300B, and maintenance timings thereof are managed based on time. For these first components, in the processing of the utilization rate calculation 423, based on a fixed available usage time Tp and a usage time T (an elapsed time from the latest maintenance), the utilization rate R is calculated using T/Tp×100.

Meanwhile, the reaction cell 321 and the pipette nozzle (sample probe) illustrated in FIG. 8 are second components intermittently used accompanying the analysis of the sample during the operation of the automatic analyzers 300A and 300B, and maintenance timings thereof are managed based on the number of uses. In a case of a component such as the reaction cell 321 for which maintenance necessity is determined in the cell blank measurement, the number of actual uses varies before the next maintenance. Therefore, for the second component such as the reaction cell 321, a usage time is estimated based on the maintenance history 412 as described above, and a ratio (N/Np×100) of the number of uses N to the number of available uses Np estimated based on the usage time is calculated as the utilization rate R.

For the second component, it also is ruled that maintenance (cleaning) should be performed when the pipette nozzle is used for a specific number of times C (a fixed number of available uses). The ruled cleaning of the pipette nozzle here is not cleaning that is performed every time sample dispensing is executed in an analysis process, but cleaning serving as maintenance in which a cleaning time or the number of times of circulation of a cleaning solution is increased. For a second component such as the pipette nozzle for which a maintenance timing is determined based on a fixed number of uses, a fixed set value is set for the number of available uses Np used in the processing of the utilization rate calculation 423. Although a value used as the number of available uses Np is not a variable estimated value but a fixed set value, which is a difference, the utilization rate R of the pipette nozzle or the like is also calculated to be N/Np×100 as in the same way as for the reaction cell 321.

The memory 410 of the computer 400 or the memory 331 of the control device 303 stores determination criteria (an available usage time, the number of available uses, and the like) of execution of the maintenance of the first components and the second components specified as shown in FIG. 8. When a predetermined condition is satisfied based on the criteria, the computer 400 or the control device 303 outputs an alarm requesting maintenance of a corresponding component to, for example, the operation device 401. In a case of a first component, an alarm is output when the usage time reaches the available usage time. For a component such as the reaction cell 321 among second components for which the maintenance necessity is determined by a test, an alarm is output when it is determined by a predetermined test (for example, the cell blank measurement) that maintenance is necessary. For a component such as the pipette nozzle among the second components for which the maintenance necessity is determined simply by the number of uses, an alarm is output when the number of uses reaches the number of available uses.

—Screen Example—

FIG. 9 is a diagram illustrating an example of a screen displaying the utilization rates of management target components. The screen shown in FIG. 9 is, for example, a screen displayed on the monitor of the operation device 401 according to a display signal from the computer 400 corresponding to a predetermined operation of the operation device 401. The screen is displayed based on utilization rates of management target components calculated by the calculation device 420 and data based on the calculation. When another computer (not shown) is connected to the computer 400 via the network, the screen in FIG. 9 can be displayed on a monitor of the other computer. On the screen in FIG. 9, indicators 91 to 94 and a switch 95 are displayed.

The indicator 91 indicates a use status of the light source lamp 326 of the automatic analyzer 300A (denoted as a first module in FIG. 9). An overall length of the indicator 91 corresponds to the available usage time Tp set for the light source lamp 326, and the indicator 91 visually displays how much the usage time T of the light source lamp 326 occupies in the available usage time Tp. For the usage time T of the light source lamp 326, a numerical value is also displayed in an item field 91*a* of the indicator 91. The usage time T of the indicator 91 and the numerical value in the item field 91*a* increase accompanying the operating time of the automatic analyzer 300A. In the example in FIG. 9, a case of displaying data regarding the light source lamp 326 is illustrated, and alternatively, data regarding another first component or a plurality of first components may be displayed. In addition, data regarding any selected first component may be displayed.

The indicator 92 indicates a use status of the reaction cell 321 of the automatic analyzer 300A. An overall length of the indicator 92 corresponds to the number of available uses Np estimated for the reaction cell 321, and the indicator 92 visually displays how much the number of uses N of the reaction cell 321 occupies in the number of available uses Np. For the number of uses N of the reaction cell 321, a numerical value is also displayed in an item field 92*a* of the indicator 92. Every time the reaction cell 321 is used, the number of uses N of the indicator 92 and the numerical value in the item field 92*a* increase. In the example in FIG. 9, a case of displaying data serving as a reference of a replacement timing of the reaction cell 321 is illustrated, and alternatively, data regarding another second component or a plurality of second components may be displayed. In addition, data regarding any selected second component may be displayed.

The indicators 93 and 94 indicate use statuses of the light source lamp 326 and the reaction cell 321 of the automatic analyzer 300B (denoted as a second module in the same drawing). The indicators 93 and 94 are displayed in the same manner as the indicators 91 and 92, and numerical values are also displayed in item fields 93*a* and 94*a* similarly to the indicators 91 and 92.

The switch 95 is a switch for switching between activation and inactivation of a maintenance opportunity suppression mode according to the conveyance control 424 of the calculation device 420. The maintenance opportunity suppression mode is a sample distribution function of selecting a prioritized device, to which a sample is preferentially supplied, based on a usage time of a first component and suppressing a maintenance opportunity of a management target component. A sample distribution operation according to the maintenance opportunity suppression mode will be described later with reference to FIG. 10.

In the embodiment, a case is illustrated where a check box displayed on the screen in FIG. 9 is used as the switch 95. When the check box is checked, the maintenance opportunity suppression mode is activated, and when the check box is unchecked, the maintenance opportunity suppression mode is inactivated. However, the switch 95 is not limited to a mode illustrated in FIG. 9, and may be replaced with a button of another display mode. For example, the switch 95 may be replaced with a physical switch provided in the operation device 401, the analyzer main body 301, or the like.

—Sample Distribution Operation (Maintenance Opportunity Suppression Mode)—

FIG. 10 is a flowchart illustrating a procedure of the sample distribution operation for the automatic analyzers 300A and 300B performed by the computer 400. The procedure illustrated in this flowchart is always repeatedly executed during an analysis operation of the automatic analyzers 300A and 300B. When the sample rack 2 is loaded to the automatic analysis system, it is determined according to the procedure illustrated in FIG. 10 in which of the automatic analyzers 300A and 300B the sample is analyzed.

Step S101

When the automatic analyzers 300A and 300B are started, the computer 400 starts the flow in FIG. 10 and determines whether the maintenance opportunity suppression mode is activated (step S101). When the inactivation of the maintenance opportunity suppression mode is selected by the switch 95 in FIG. 9, the computer 400 proceeds from step S101 to step S120. On the other hand, when the switch 95 selects the activation of the maintenance opportunity suppression mode, the computer 400 proceeds from step S101 to step S102.

Steps S102 to S107

When the procedure proceeds to step S102, the computer 400 refers to current usage times Ta and Tb of a predetermined first component (in this example, the light source lamp 326) currently used in the automatic analyzers 300A and 300B that are recorded in the memory 410. The usage times Ta and Tb of the automatic analyzers 300A and 300B are each compared with a preset set time TO (steps S103 to S105). The set time T0 is a value set to be smaller than the available usage time Tp of the light source lamp 326, and is, for example, a value of about ⅔ of the available usage time Tp. When the usage times Ta and Tb of the light source lamps 326 of the automatic analyzers 300A and 300B are both equal to or less than the set time T0 as a result of the determination in steps S103 to S105, the computer 400 advances the procedure to step S120. On the other hand, when the usage time of any one of the light source lamps 326 of the automatic analyzers 300A and 300B exceeds the set time T0, the computer 400 selects the automatic analyzer whose usage time exceeds the set time T0 as the prioritized device. For example, when only the usage time Ta exceeds the set time T0, the computer 400 advances the procedure to step S106, selects the automatic analyzer 300A as the prioritized device, and ends the procedure in FIG. 10. When only the usage time Tb exceeds the set time T0, the computer 400 advances the procedure to step S107, selects the automatic analyzer 300B as the prioritized device, and ends the procedure in FIG. 10. When both of the usage times Ta and Tb exceed the set time T0, the computer 400 advances the procedure to step S108.

Steps S108 to S110

When the procedure is advanced to step S108, the computer 400 refers to the current number of uses N1 and the current number of uses N2 of a predetermined second component (the reaction cell 321 in this example) currently used in the automatic analyzers 300A and 300B that are recorded in the memory 410. The procedure is advanced to the subsequent step S109, and the computer 400 calculates current utilization rates R1 and R2 of the reaction cells 321 in the automatic analyzers 300A and 300B based on the number of available uses Np calculated as described above and the number of uses N1 and the number of uses N2 of the reaction cells 321. In the next step S110, the computer 400 compares the utilization rates R1 and R2 of the reaction cells 321 of the automatic analyzers 300A and 300B. When the utilization rate R1 of the reaction cell 321 of the automatic analyzer 300A is higher (R1>R2) as a result of the comparison, the computer 400 advances the procedure to step S106, selects the automatic analyzer 300A as the prioritized device, and ends the procedure in FIG. 10. On the other hand, when the utilization rate R2 of the reaction cell 321 of the automatic analyzer 300B is higher (R1<R2), the computer 400 advances the procedure to step S107, selects the automatic analyzer 300B as the prioritized device, and ends the procedure in FIG. 10. As described above, when there are a plurality of automatic analyzers in which the usage time of the predetermined first component exceeds the set time T0, the computer 400 compares the number of uses among the predetermined second components of the plurality of automatic analyzers, and selects the automatic analyzer in which the number of uses of the second component is the largest as the prioritized device.

When the maintenance opportunity suppression mode is activated during operation of the automatic analyzers 300*a* and 300B, the computer 400 repeatedly executes the above procedure of steps S101 to S110. When the maintenance opportunity suppression mode is activated, a control signal is output to the conveyance line 100 according to the selection of the prioritized device in steps S101 to S110, in the processing of the conveyance control 424 performed by the calculation device 420 of the computer 400. As a result, the sample to be used for analysis in the reaction cell 321 (predetermined second component) is conveyed to the prioritized device among the automatic analyzers 300A and 300B, in which the maintenance timing of the first component is nearer, in preference to the other automatic analyzer.

—Sample Distribution Operations (Throughput-Prioritized Mode)—

FIG. 11 is a flowchart illustrating a procedure of sample distribution operations performed on the automatic analyzers 300A and 300B by the computer 400 when the maintenance opportunity suppression mode is inactivated. The flowchart illustrated in FIG. 11 shows details of the procedure of step S120 in FIG. 10, and is an example of a throughput-prioritized mode in which a prioritized device is selected with emphasis on throughput. The throughput-prioritized mode (step S120) is executed when the maintenance opportunity suppression mode is inactivated by the switch 95 (FIG. 10). In addition, even in a case where the maintenance opportunity suppression mode is activated, the throughput priority mode is executed in a scene where the usage times Ta and Tb of the light source lamps 326 of the automatic analyzers 300A and 300B are both equal to or less than the set time T0, and higher efficiency is expected than when the maintenance opportunity suppression mode is applied (FIG. 10).

When the procedure of step S120 is started, the computer 400 determines, in step S121, which of the automatic analyzers 300A and 300B is in a low-load state. Load states of the automatic analyzers 300A and 300B can be evaluated by calculating expected values of total processing times of the samples currently distributed to the automatic analyzers 300A and 300B based on, for example, a sample distribution history and an analysis execution history of the two automatic analyzers recorded in the memory 410. When the automatic analyzer 300B is lower in load than the automatic analyzer 300A as a result of the determination, the computer 400 advances the procedure to step S125, selects the automatic analyzer 300B as a prioritized device, and ends the procedure in FIG. 11 to return the procedure to step S101 in FIG. 10.

On the other hand, when the automatic analyzer 300A is lower in load than the automatic analyzer 300B, the computer 400 advances the procedure to step S122, and determines which buffer unit 302 of the automatic analyzers 300A and 300B holds fewer sample containers 1. The number of waiting samples of the automatic analyzer 300A and the number of waiting samples of the automatic analyzer 300B can be calculated based on, for example, the sample distribution history and the analysis execution history of the two automatic analyzers recorded in the memory 410. When the number of waiting samples of the automatic analyzer 300B is smaller than that of the automatic analyzer 300A as a result of the determination, the computer 400 advances the procedure to step S125, selects the automatic analyzer 300B as a prioritized device, and ends the procedure in FIG. 11 to return the procedure to step S101 in FIG. 10.

On the other hand, when the number of waiting samples of the automatic analyzer 300A is smaller than that of the automatic analyzer 300B, the computer 400 advances the procedure to step S123 to determine which of the automatic analyzers 300A and 300B is close to a sample rack loading position. It can be determined which automatic analyzer is closer, based on known configuration data of the automatic analysis system. When the automatic analyzer 300B is closer than is the automatic analyzer 300A as a result of the determination, the computer 400 advances the procedure to step S125, selects the automatic analyzer 300B as a prioritized device, and ends the procedure in FIG. 11 to return the procedure to step S101 in FIG. 10. On the other hand, when the automatic analyzer 300A is closer than is the automatic analyzer 300B, the computer 400 advances the procedure to step S124, selects the automatic analyzer 300A as a prioritized device, and ends the procedure in FIG. 11 to return the procedure to step S101 in FIG. 10.

When the sample is simply distributed to, for example, an automatic analyzer that is closer without considering the load state or the like of the automatic analyzers 300A and 300B, there is a possibility that a bias occurs in loads of the automatic analyzers 300A and 300B and the throughput is reduced. On the other hand, by distributing the sample in consideration of the load state and the like as illustrated in FIG. 11, the bias of the load is suppressed, and a decrease in the throughput is suppressed.

—Effects—

(1) When replacing the light source lamp 326, it is necessary to perform a prior operation such as removing the reaction disk 311 from the analyzer main body 301, and it is necessary to perform a subsequent operation such as attaching the reaction disk 311 to the analyzer main body 301 after the replacement of the light source lamp 326. During these operations, it is essential to stop the automatic analyzer. When replacing the reaction cell 321, the reaction disk 311 is removed from the analyzer main body 301, all the used reaction cells 321 are removed from the reaction disk 311, and the reaction disk 311 in which the new reaction cells 321 are set is attached to the analyzer main body 301. It is also essential to stop the automatic analyzer during these operations. At the time of maintenance of another management target component, it is also necessary to stop the automatic analyzer. Therefore, when opportunities for maintenance of the management target components separately visit, a stop frequency of the automatic analyzer increases.

At this time, since the first component such as the light source lamp 326 is constantly used in each of the automatic analyzers 300A and 300B in a constant use state, it is difficult to adjust a maintenance timing thereof. On the other hand, regarding the second component such as the reaction cell 321, a timing of arrival of a maintenance opportunity can be adjusted by controlling a use opportunity thereof. Therefore, in the automatic analysis system of the embodiment, the automatic analyzer in which the usage time T of the predetermined first component (the light source lamp 326 in the example in FIG. 10) exceeds the set time T0 is selected as the prioritized device, and the sample is conveyed to the selected prioritized device in preference to another automatic analyzer. Accordingly, the analysis of the sample is preferentially performed in the prioritized device, that is, the automatic analyzer in which the maintenance timing of the first component is approaching, and the number of uses of the second component (the reaction cell 321 in the example in FIG. 10) in the prioritized device is increased earlier than in another automatic analyzer. As a result, the maintenance opportunity of the predetermined second component in the prioritized device is advanced, and the use of the predetermined second component significantly proceeds when the maintenance opportunity of the predetermined first component in the prioritized device arrives. When the utilization rate of the predetermined second component is equal to or higher than a certain level, the maintenance of the second component may be performed at the same time as an opportunity for the maintenance of the predetermined first component.

By collecting the maintenance opportunities of a plurality of management target components as described above, it is possible to reduce the stop frequency of the automatic analyzer associated with the maintenance of the management target component, reduce the burden on the user, and improve the processing efficiency of the analysis of the sample.

In particular, since the operations accompanying replacement such as the operations of attaching and removing the reaction disk 311 are common to the reaction cell 321 and the light source lamp 326, great effects in terms of efficiency are obtained when both the reaction cell 321 and the light source lamp 326 can be replaced at one maintenance opportunity.

(2) As described in steps S108 to S110 in FIG. 10, when there are a plurality of automatic analyzers in which the usage time T of the first component exceeds the set time T0, the prioritized device is selected based on the number of uses N of the second component in the plurality of automatic analyzers. Accordingly, when there are a plurality of automatic analyzers in which the maintenance timing of the first component is approaching, the automatic analyzer in which the maintenance opportunity of the second component can be caused to come earlier is selected as the prioritized device. The maintenance timing of the second component in the prioritized device is more likely to match the maintenance timing of the first component. For example, after the automatic analyzer 300A is selected as the prioritized device, the usage time T of the light source lamp 326 in the automatic analyzer 300B may exceed the set time T0 before the maintenance timing comes. In this case, at a time point when the usage time T of the light source lamp 326 in the automatic analyzer 300B exceeds the set time T0, the number of uses N of the reaction cell 321 in the automatic analyzer 300B may be larger than that in the automatic analyzer 300A. In such a scene, the automatic analyzer 300B in which the maintenance timing of the second component arrives earlier is newly selected as the prioritized device, and the prioritized device is flexibly switched in response to a change in the situation.

(3) Since the first component and the second component are common in the plurality of automatic analyzers, the analysis having common items can be performed by another automatic analyzer during a period in which one automatic analyzer is stopped. Therefore, for example, even when the automatic analyzer 300A is stopped for replacement of the reaction cell 321 and the light source lamp 326, the automatic analyzer 300B can continuously perform the biochemical analysis during that time, and stagnation of analysis processing can be suppressed. In addition, when the components are common between the automatic analyzers, the number of items of the management components is reduced, which is advantageous in terms of component management.

However, it is not essentially necessary for the plurality of automatic analyzers constituting the automatic analysis system to share common management target components in order to obtain the effect of matching the maintenance timings of the predetermined first component and the predetermined second component in the same automatic analyzer.

(4) Since the switch 95 for inactivating the maintenance opportunity suppression mode is prepared, when it is desirable to distribute the sample to the automatic analyzers 300A and 300B in the throughput-prioritized mode normally, the maintenance opportunity suppression mode can be inactivated. Flexible handling is possible in a scene such as one where the analysis processing is desired to be advanced with emphasis on throughput regardless of the utilization rate of the first component.

(5) For example, although the reaction cell 321 is a second component that is intermittently used, the maintenance opportunity thereof comes when the maintenance thereof is determined to be necessary in the cell blank measurement as described above, and thus the replacement timing is not simply determined by only the current number of uses. Therefore, statistics of the replacement interval of the reaction cell 321 are collected from the maintenance history and the available usage time Tp is estimated, and the expected number of available uses Np is calculated from the available usage time Tp, so that the replacement timing of the currently used reaction cell 321 is approximately estimated. The current number of uses N of the reaction cell 321 with respect to the expected number of available uses Np, that is, the estimated value of the utilization rate R of the reaction cell 321, is displayed by the indicators 92 and 94 as illustrated in FIG. 9. Accordingly, it is possible to notify the user of a reference about the replacement timing of the reaction cell 321 that is usually abruptly notified in the cell blank measurement. By a visual display with the indicator, the replacement timing of the reaction cell 321 can also be easily grasped instinctively.

REFERENCE SIGNS LIST

95: switch
100: conveyance line
300A, 300B: automatic analyzer
321: reaction cell (second component)
326: light source lamp (first component)
400: computer
410: memory
412: maintenance history
N: the number of uses
Np: the number of available uses
T: usage time
T0: set time

The invention claimed is:

1. An automatic analysis system comprising:
a plurality of automatic analyzers, each automatic analyzer includes a first component that is constantly used during operation and a second component that is intermittently used;
a conveyance line connected to the plurality of automatic analyzers and including a conveyance unit configured to transport a sample to the plurality of automatic analyzers; and
a computer configured to control the conveyance line to distribute the sample to the plurality of automatic analyzers, and including:
a memory configured to store a usage time of the first component of each of the plurality of automatic analyzers, and a maintenance history of each of the plurality of automatic analyzers,
a timer configured to measure the usage time of the first component, and
a calculation device,
wherein the calculation device is configured to:
compare the usage time of the first component of each automatic analyzer with a set time,
select, when the usage time of the first component of any one of the plurality of automatic analyzers exceeds the set time, the automatic analyzer in which the usage time of the first component exceeds the set time as a prioritized device, and
output a control signal to the conveyance unit to direct transport of the sample to the prioritized device in preference to another automatic analyzer such that usage of the second component in the prioritized device is increased to cause a maintenance timing of the second component to coincide with a maintenance timing of the first component.

2. The automatic analysis system according to claim 1, wherein
the memory is further configured to store a number of uses of the second component of each automatic analyzer, and
the calculation device is further configured to, when there are a plurality of automatic analyzers each having the usage time of the first component exceeding the set time, compare the number of uses of the second component among the plurality of automatic analyzers stored in the memory, and select an automatic analyzer in which the number of uses of the second component is largest as the prioritized device.

3. The automatic analysis system according to claim 1, wherein
the second component is a reaction cell configured to allow the sample to be dispensed therein, and
the first component is a light source lamp configured to emit inspection light for irradiation of the reaction cell.

4. The automatic analysis system according to claim 1, wherein
the first component and the second component are common to the plurality of automatic analyzers.

5. The automatic analysis system according to claim 1, further comprising:
an operation device including a display and an input interface, and
wherein the input interface includes a switch configured to switch between activation and inactivation of a function of selecting the prioritized device based on the usage time of the first component.

6. The automatic analysis system according to claim 1, wherein
the calculation device is further configured to:
calculate a number of available uses of the second component, which is being used currently, based on the maintenance history stored in the memory, and
control a display to display a number of uses of the second component which is being used currently with respect to the number of available uses.

7. A sample distribution method for a plurality of automatic analyzers in an automatic analysis system, the automatic analysis system including the plurality of automatic analyzers, and each of the plurality of automatic analyzers including a first component that is constantly used during operation and a second component that is intermittently used, the method comprising:
measuring, by a timer, a usage time of a first component of each automatic analyzer;
comparing, by a calculation device, the usage time of the first component of each automatic analyzer with a set time;
selecting, when the usage time of the first component of any one of the plurality of automatic analyzers exceeds the set time, the automatic analyzer in which the usage time of the first component exceeds the set time as a prioritized device; and
controlling a conveyance unit to distribute a sample to be used for analysis in the second component to the prioritized device in preference to another automatic analyzer, and wherein the controlling increases usage of the second component in the prioritized device to cause a maintenance timing of the second component to coincide with a maintenance timing of the first component.

* * * * *